(12) United States Patent
Sokol et al.

(10) Patent No.: US 9,525,261 B2
(45) Date of Patent: Dec. 20, 2016

(54) TEMPORAL PULSE SHAPING FOR LASER BOND INSPECTION

(71) Applicant: LSPT Technologies, Inc., Dublin, OH (US)

(72) Inventors: David Sokol, Dublin, OH (US); Jeff Dulaney, Delaware, OH (US); Allan Clauer, Worthington, OH (US)

(73) Assignee: LSP Technologies, Inc., Dublin, OH (US)

( * ) Notice: Subject to any disclaimer, the term of this patent is extended or adjusted under 35 U.S.C. 154(b) by 0 days.

(21) Appl. No.: 14/720,737

(22) Filed: May 23, 2015

(65) Prior Publication Data

US 2016/0197448 A1 Jul. 7, 2016

Related U.S. Application Data

(60) Provisional application No. 62/002,175, filed on May 22, 2014.

(51) Int. Cl.
*H01S 3/00* (2006.01)
*B23K 26/00* (2014.01)
*H01S 3/23* (2006.01)

(52) U.S. Cl.
CPC ............ *H01S 3/0085* (2013.01); *B23K 26/00* (2013.01); *H01S 3/2308* (2013.01)

(58) Field of Classification Search
CPC ...... H01S 3/067; H01S 3/0057; H01S 3/0085; B23K 26/00
See application file for complete search history.

(56) References Cited

U.S. PATENT DOCUMENTS

| | | | | |
|---|---|---|---|---|
| 4,865,683 A | * | 9/1989 | Burns | B23K 26/032 117/39 |
| 6,178,032 B1 | * | 1/2001 | Huang | G02F 1/0123 359/237 |
| 7,770,454 B2 | * | 8/2010 | Sokol | G01N 29/2412 73/588 |
| 2006/0018586 A1 | * | 1/2006 | Kishida | G01B 11/16 385/12 |
| 2009/0016388 A1 | * | 1/2009 | Gu | B23K 26/0635 372/25 |
| 2011/0182306 A1 | * | 7/2011 | Hosseini | B23K 26/0624 372/25 |
| 2014/0224020 A1 | * | 8/2014 | Sweet | G01N 29/045 73/588 |
| 2015/0355062 A1 | * | 12/2015 | Housen | G01N 3/08 73/827 |

* cited by examiner

*Primary Examiner* — Eric Bolda
(74) *Attorney, Agent, or Firm* — Benesch Friedlander Coplan Aronoff, LLP; Benjamen E. Kern; Eric S. Foster

(57) ABSTRACT

Methods, systems, and apparatuses are disclosed for temporal pulse shaping of laser pulses used in laser bond inspection applications.

24 Claims, 4 Drawing Sheets

TEMPORAL PULSE SHAPING FOR LASER BOND INSPECTION

CROSS-REFERENCE TO RELATED APPLICATIONS

This application claims priority from U.S. Provisional Patent Application No. 62/002,175, filed on May 22, 2014, which is incorporated by reference herein in its entirety.

BACKGROUND

Laser bond inspection ("LBI") is a non-destructive evaluation ("NDE") technique that can be used to characterize the adhesive bond strength within bonded structures through the use of controlled, laser-induced localized stress waves. LBI uses a laser pulse striking opaque and transparent overlays on the surface of a bonded article to create a plasma plume which creates a resultant shockwave. The shock from the laser pulse produces a compression stress wave that propagates to the back surface of the bonded article where it reflects back as a tensile wave. This tensile wave propagating through the bonded article provides proof test loading. When the reflected tensile wave arrives back at the front surface of the bonded article, it reflects into compression again, and the cycle repeats. Sensors are used to detect surface movement on the surface of the bonded article and the sensed surface movement may be used to evaluate the bond integrity of a bonded article. There is no surface damage during LBI. LBI uses a laser pulse width of about 70 ns to about 300 ns. Beam diameter of LBI is selected as a compromise between the need to have a large area for planar wave generation and a reasonable sized beam for the inspection of small zones in the object. A beam size of about 10.0 mm is a suitable compromise. The use of a large diameter laser beam of several mm or more generates suitable internal stress for the evaluation of internal bonds and avoids surface spallation of a bonded article under LBI. Fluence is a measure of energy delivered per unit area, and LBI uses fluence values ranging between about 4 $J/cm^2$ to about 6 $J/cm^2$ for the interrogation of weak bonds, while medium strength bonds fail around about 16 $J/cm^2$.

The present application appreciates that customizing a laser pulse for LBI applications may be a challenging endeavor.

SUMMARY

Systems and methods are provided for temporal pulse shaping of a pulsed laser beam used in LBI applications.

In one embodiment, a system for temporal pulse shaping of a laser beam used for laser bond inspection is provided, the system comprising: a laser; a modulator; a high voltage driver; a waveform generator; a polarizer; and an amplifier.

In another embodiment, a system for temporal pulse shaping of a pulsed laser output used for laser bond inspection is provided, the system comprising: a laser operable to produce a pulsed laser beam, wherein the laser is at least one of: a diode pumped continuous wave laser, a diode pumped fiber laser, and a long pulse laser oscillator; a modulator operable to modulate the pulsed laser beam, wherein the modulator is at least one of: an electro-optic modulator, an acousto-optic modulator, and an electro-optic Pockels cell; a high voltage driver operable to output a high voltage signal in response to an input waveform, the high voltage driver operatively connected to the modulator and a waveform generator; the waveform generator, wherein the waveform generator is operable to generate at least one waveform in response to a trigger signal from a processor, wherein the at least one waveform is input into the high voltage driver to generate the high voltage signal; a polarizer, comprising a first polarization direction; and an amplifier, the amplifier operable to amplify the modulated pulsed laser beam to output an amplified, modulated, pulsed laser beam.

In another embodiment, a method for temporal pulse shaping of a laser beam used in laser bond inspection of a workpiece is provided, the method comprising the acts of: (1) determining a thickness at one or more locations on the workpiece and selecting a pulse width and a temporal profile of the laser beam corresponding to the determined thickness; (2) generating the laser beam with a laser and inputting the laser beam into a modulator; (3) generating a waveform from a waveform generator, wherein the waveform is based on the selected pulse width and the selected temporal profile; (4) inputting the generated waveform into a high voltage driver to output a high voltage signal; (5) inputting the high voltage signal into the modulator to modulate and shape a temporal profile of the laser beam based on the selected pulse width and the selected temporal profile; (6) amplifying the modulated and shaped laser beam with an optical amplifier; (7) delivering the amplified, modulated, and shaped laser beam to the one or more locations on the workpiece; and (8) repeating steps 1-7 for each subsequent location on the workpiece.

BRIEF DESCRIPTION OF THE DRAWINGS

The accompanying figures, which are incorporated in and constitute a part of the specification, illustrate various example systems, methods, and results, and are used merely to illustrate various example embodiments.

DETAILED DESCRIPTION

Embodiments claimed herein disclose temporal pulse shaping for laser pulses used in LBI applications. In LBI applications, real time variation of laser temporal profiles, including variations to both pulse width and pulse shape, is beneficial.

LBI effectiveness is affected by the pulse width of a laser pulse. Bonded articles with thicker components may require longer pulses of about 300 ns to inspect, while thinner component may require a pulse width of about 100 ns to inspect. As a typical bonded article under inspection may vary in thickness, it may be beneficial to vary pulse width between about 100 ns and 300 ns during LBI. Optimizing a pulse width for a thickness of a bonded article in real time may reduce inspection time and costs significantly.

Figure 1:
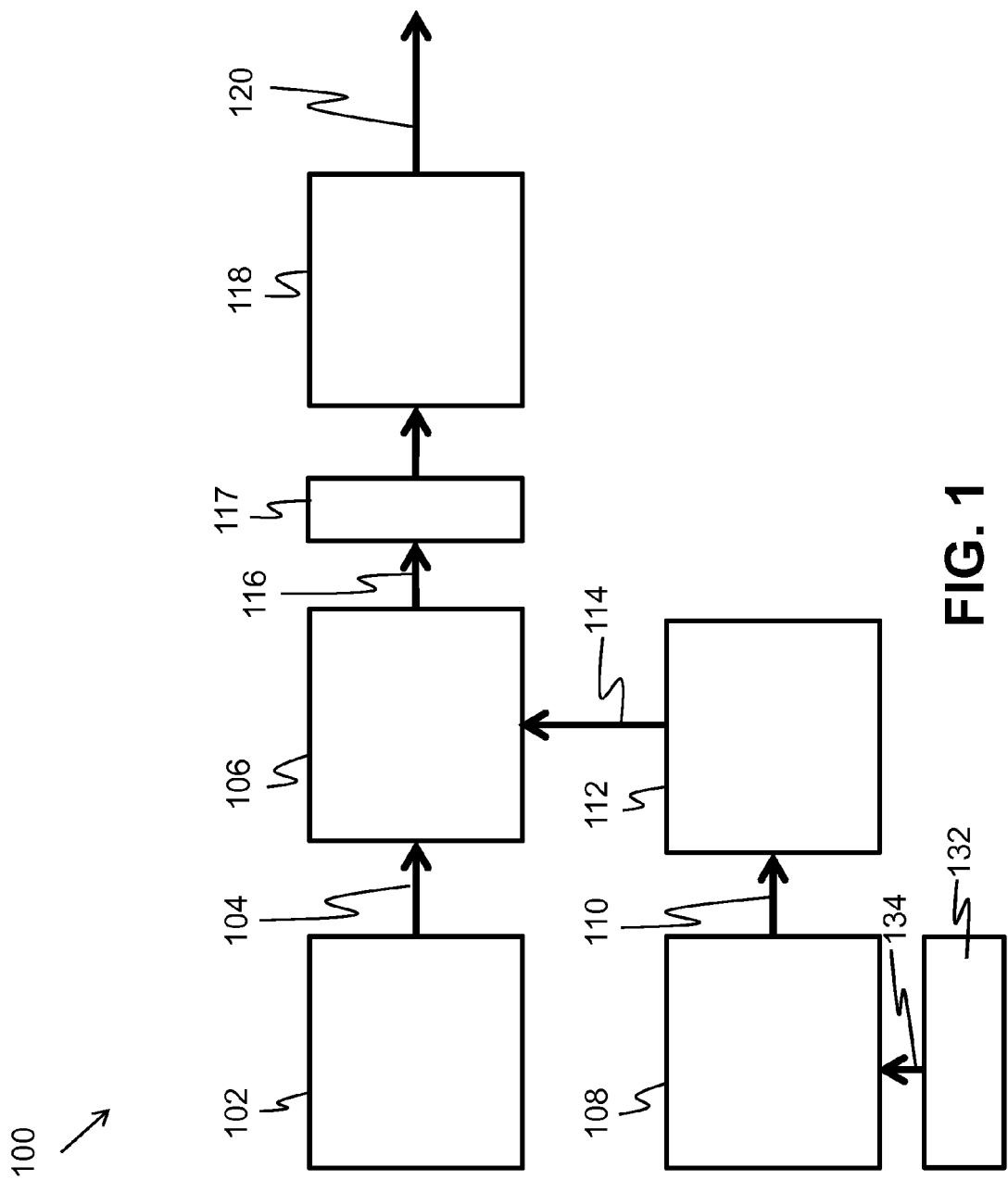
FIG. 1 illustrates a schematic view of an example system for temporal pulse shaping of a laser beam pulse.

With reference to FIG. 1, a schematic view of a system 100 for temporal pulse shaping of a laser pulse 104 is illustrated. System 100 for temporal pulse shaping of an input laser pulse 104 may include: a laser 102, a modulator 106, a waveform generator 108, a high voltage driver 112, a polarizer 117, and an amplifier 118.

Laser 102 may be a diode pumped continuous wave (CW) laser, a diode pumped fiber laser, or a long pulse laser oscillator. Laser 102 may include a laser crystal such as a neodymium-doped YAG (Nd:YAG), neodymium-doped vanadate (ND:YVO$_4$), neodymium-doped YLF (Nd:YLF), or any other sold-state crystal material, in either a rod or a slab gain medium to produce a pulsed laser beam. Laser 102 may be configured to deliver laser pulses having: a pulse energy of between about 1 J and about 50 J (at the output of the final amplifier module 118); wavelengths between about 1053 nm and about 1064 nm; and pulse widths of between about 100 ns and about 300 ns. Laser 102 may be configured as single frequency in a TEM$_{00}$ mode, as TEM$_{00}$ only, or setup to operate in multimode. In one embodiment, laser 102 may also include amplification. In another embodiment, laser 102 may only comprise an oscillator. In another embodiment, laser 102 may output a continuous wave (CW) laser beam.

Modulator 106 may be at least one of an electro-optic modulator, an acousto-optic modulator, and an electro-optic Pockels cell. In one embodiment, modulator 106 is a Pockels cell used with high voltage driver 112, waveform generator 108, and polarizer 117 to modify a temporal profile of input laser pulse 104. In one embodiment, Pockels cell 106 is a fast modulator operable to modulate in time measurable in a range of nanoseconds to picoseconds. Pockels cell 106 may comprise different types of crystals and cell sizes, and thus require different levels of voltage inputs for proper operation. Pockels cell 106 may require a voltage input in excess of 1000V, and may use high voltage driver 112 to produce high voltages needed for proper operation. In another embodiment, modulator 106 is an acousto-optic modulator used with a lower power CW laser beam to cut out a temporal profile of a CW laser beam. In this embodiment, additional amplifiers are used to amplify a temporal profile cut out of a CW laser beam. Modulator 106 may be set up in a pulse slicer mode using high voltage driver 112 and polarizer 117 to produce a temporal profile of desired temporal pulse width and temporal pulse shape. In pulse slicer mode, high voltage driver 112 may provide high voltage signals to modulator 106 to rotate a polarization of input laser pulse 104. If the orientation of polarization axis of input laser pulse 104 aligns with an orientation of a polarization axis of polarizer 117, input laser pulse 104 may pass through polarizer 117 and further through system 100. In one embodiment, modulator 106 and polarizer 117 are set up to not allow transmission of input laser pulse 104. Varying a voltage used to operate modulator 106 may vary a degree of transmission, for example between 0-100%, of input laser pulse 104 through polarizer 117. Use of modulator 106 in pulse slicer mode may be used to shape a leading and a trailing edge of a temporal pulse profile for input laser pulse 104.

Figure 2:
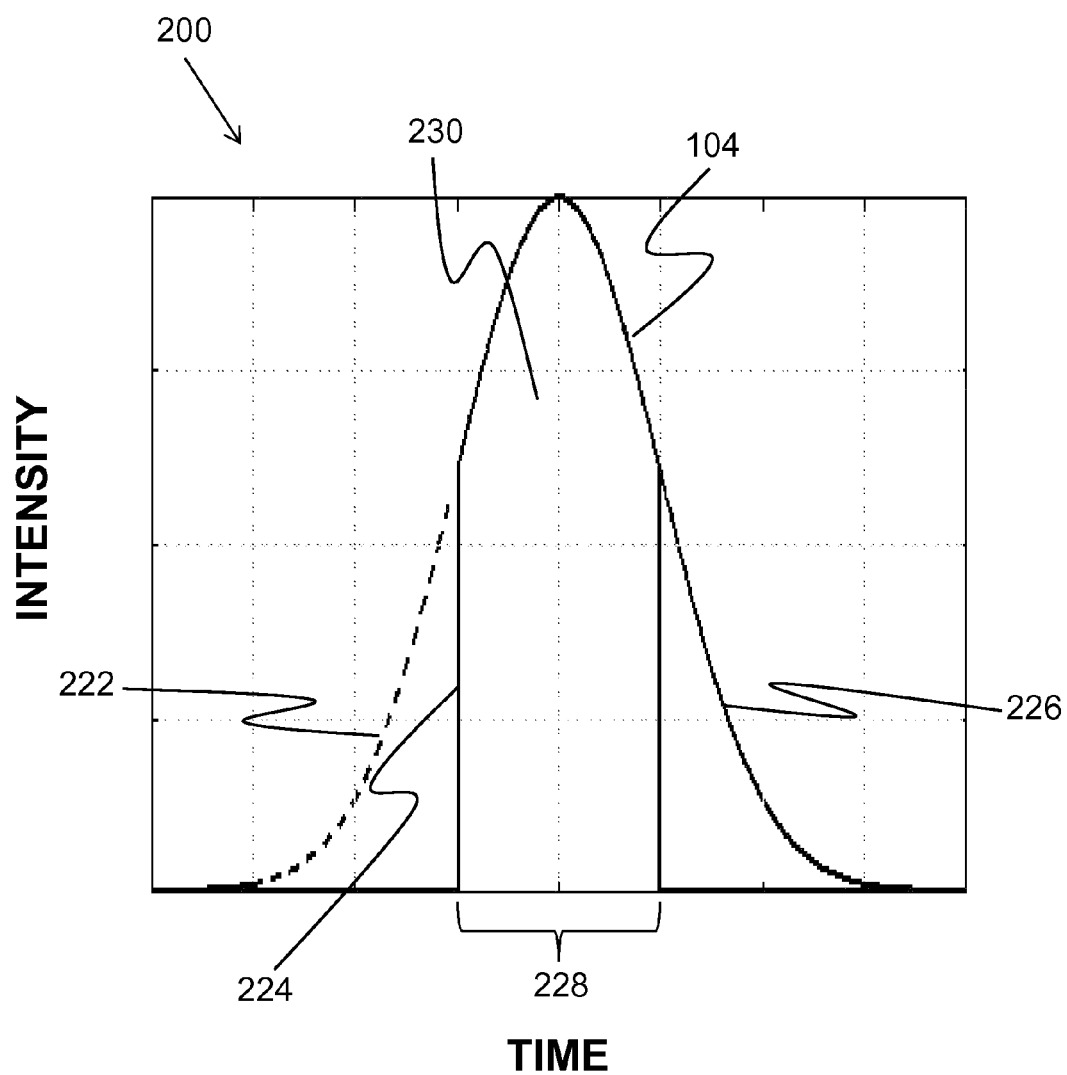
FIG. 2 illustrates an example modification to a temporal profile of a pulsed laser beam.

With reference to FIG. 2, a temporal profile 200 of an example input laser pulse 104 is illustrated. Temporal profile 200 of input laser pulse 104 may be substantially Gaussian in appearance. Leading edge 222 may be sliced off by modulator 106 operating in pulse slicer mode as described above, so as to produce a sharper leading edge 224. Sharp leading edge 224 may provide a faster rise time for input laser pulse 104. Trailing edge 226 may also be sliced off by modulator 106 to vary a pulse width 228 of laser pulse 104. In one embodiment, rise time of laser pulse 104 is less than about 5 ns.

Use of modulator 106 in pulse slicer mode may be used to shape a leading edge 222, and trailing edge 226 of input laser pulse 104, but use of modulator 106 in pulse slicer mode alone may not modify an interior shape 230 of input laser pulse 104 between leading edge 222 and trailing edge 226. Waveform generator 108 used with high voltage driver 112 and modulator 106 may be used to modify an interior shape 230 of input laser pulse 104. In one embodiment, modulator 106 used with waveform generator 108 and high voltage driver 112 are used to vary an amplitude of interior shape 230, and thus vary an energy level of input pulsed laser beam 104. Modulator 106 may be operable to vary a pulse width of input laser pulse 104 to a pulse width between about 50 ns and about 500 ns for use in LBI operations. Modulator 106 may be used to configure input laser pulse 104 in various temporal shapes. High voltage driver 112 may be used to control a modulation, for example, of input laser pulse 104 in modulator 106, with a high voltage signal 114 from high voltage driver 112 to modulator 106. Waveform generator 108 may be operable to control high voltage driver 112, modulator 106, and polarizer 117—specifically, by providing a unique waveform 110 to voltage driver 112 to control an output of high voltage signal 114 from high voltage driver 112 to modulator 106. Waveform generator 108 may be similar to function generators used to produce different waveforms over a range of frequencies. Waveform generator 108 may produce waveforms 110 such as sine waves, square waves, triangle waves, sawtooth waves, and the like. A small voltage, for example from 0 to 5 V may be coupled to waveform 110 to vary an amplitude of waveform 110. Thus, by varying waveform and amplitude of waveform 110, a unique signal is provided to high voltage driver 112 to select a high voltage value to couple to waveform 110 to produce high voltage signal 114. High voltage signal 114 is an amplified waveform 110. In one embodiment, waveform generator 108 produces waves with relatively small periods, for example in the order of nanoseconds to picoseconds to produce very high frequency waveforms in a frequency range of 1 GHz to 1 THz. In one embodiment, high voltage driver 112 outputting high voltage signal 114 to modulator 106 is controlled by waveform 110 from waveform generator 108. Trigger signals 134 from processing device 132 may be configured in units, for example, in units between 1-1,500. As used herein, processing device, 132 may a computer, a computer processor, and may comprise memory to execute instructions to perform a method. Each unit may represent a discrete voltage as a function of time to allow for unique time dependent voltage signals to be created. In one embodiment, processing device 132 may generate a unique time dependent voltage signal in lieu of waveform generator 108. Based on unique high voltage signal 114 which may be determined by waveform output 110, modulator 106 may allow for 0 to 100% transmission of input laser pulse 104 through modulator 106 and polarizer 117, thus shaping a temporal profile of input laser pulse 104. Pulse waveforms 110, which may be operable to produce desired temporal pulse shapes of input laser pulse 104 in modulator 106 may be preloaded into processing device 132 and selected as needed to produce desired temporal pulse shapes for LBI applications. Processing device 132 may be integrated into waveform generator 108, or processing device 132 may be remote from system 100, and operatively connected to waveform generator 108, for example, through trigger signal 134. Processing device 132 may contain a programmable instruction set that when executed, may generate and provide one or more trigger signals 134 to waveform generator 108. In one embodiment, a user can program LBI processing instructions into processing device 132 for a workpiece with varying levels of composite thicknesses and bond line locations, such as a tapered airplane wing, so that system 100 may provide an "on the fly" modification of temporal profile for input laser pulse 104 to account for different thicknesses and orientations of bonded materials. In this embodiment, LBI is automated and does not require timely adjustments to the system to account for bonded materials of different thicknesses.

System 100 may further comprise one or more amplifiers 118 which may amplify a modulated laser pulse 116 output from modulator 106 and transmitted either in whole, or in part, through polarizer 117. Amplifier 118 may amplify modulated laser pulse 116 and output an amplified, modulated laser pulse 120 such that amplified, modulated laser pulse 120 may be used for a desired LBI application.

A temporal shape of an amplified, modulated laser pulse 120 may be modified by controlling a shape of modulated input laser pulse 116. A temporal shape of modulated laser pulse 116 may result in further temporal variations in gain derived when modulated input laser pulse 116 passes through amplifier 118. A temporal variation of a gain superimposed on a temporal shape of modulated input laser pulse 116 may create a final temporal shape of amplified, modulated laser pulse 120. Various modifications in a temporal shape of amplified, modulated laser pulse 120 output from system 100 may be used to expand LBI applications.

In one embodiment, a temporal shape modification of amplified, modulated laser pulse 120, is a decrease in rise time on a leading edge of amplified, modulated laser pulse 120. It may be advantageous to minimize a rise time on a leading edge of a laser pulse. A short rise of less than about 5 ns on a leading edge of a laser pulse may prevent or postpone an occurrence of a dielectric breakdown in transparent overlays used during LBI. By preventing or postponing dielectric breakdowns of transparent overlays, more laser beam energy from amplified, modulated laser pulse 120 may be injected into a target plasma before a dielectric breakdown of a transparent overlay. A dielectric breakdown of a transparent overlay may block amplified, modulated laser pulse 120. Controlling a temporal shape of laser input pulse 104 may customize a leading edge rise time of amplified, modulated laser pulse 120. In one embodiment, temporal shaping of input laser pulse 104 to include more energy in a leading edge, and less energy in a tail edge of input laser pulse 104, with a gain saturation of modulated laser pulse 116 through amplifier 118, will decrease a leading edge rise time of amplified, modulated laser pulse 120.

Figure 3:
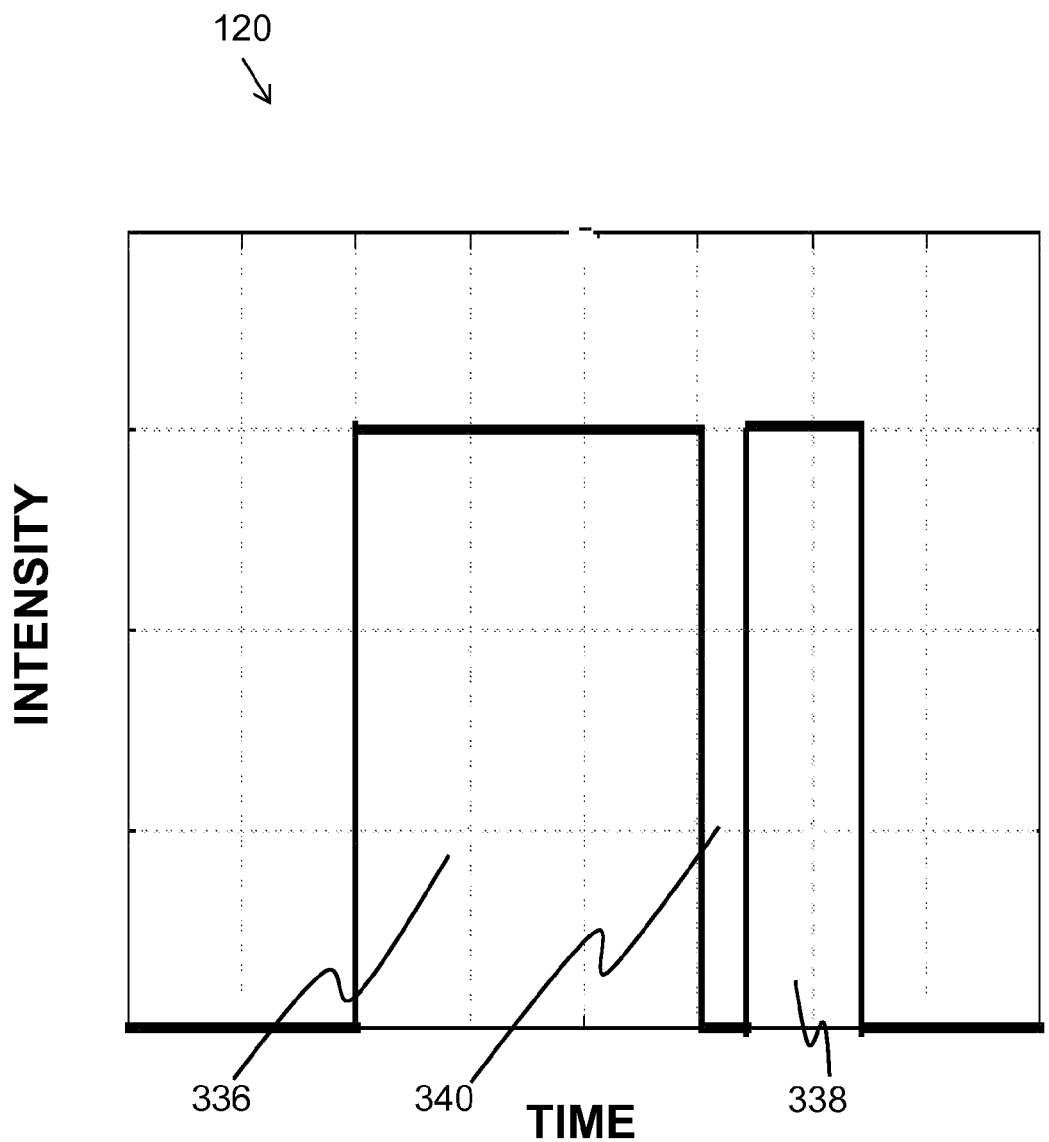
FIG. 3 illustrates an example embodiment of temporal pulse shaping for a pulsed laser beam.

With reference to FIG. 3, an example temporal profile of an amplified, modulated laser pulse 120 is illustrated. Temporal shape modification of amplified, modulated laser pulse 120, includes a single amplified, modulated laser pulse 120 output with a leading edge part 336 having a pulse width of about 300 ns and a trailing edge part 338 having a pulse width of about 100 ns with a brief nanosecond delay 340 between each pulse width. Previously, generation of two individual laser pulses each with a different pulse widths would have been required, with each pulse requiring a manual adjustment of an LBI system to set a pulse width for each pulse. System 100 may be operable to provide a single amplified modulated laser pulse 120 with a temporal pulse shape of varying pulse widths 336, 338 which may reduce time and costs associated with LBI applications.

Figure 4:
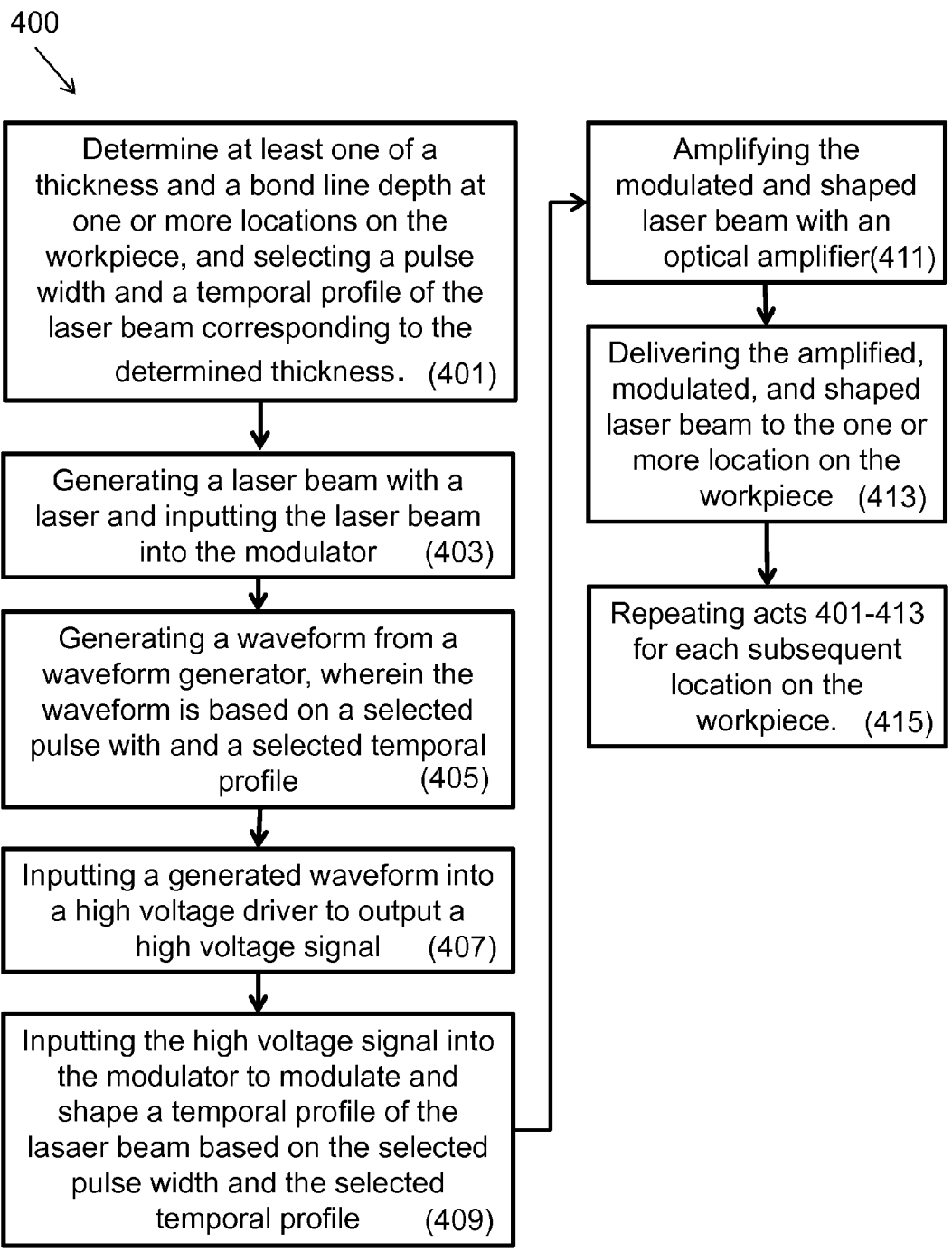
FIG. 4 is a flow chart illustrating an example method for temporal pulse shaping of a laser beam pulse.

FIG. 4 illustrates a flow chart of an example method 400 which may be used for temporal pulse shaping of a laser beam used in LBI of a workpiece. In one embodiment, method 400 includes: determining at least one of a thickness, and a bond line depth at one or more locations on the workpiece and selecting a pulse width and a temporal profile of a laser beam corresponding to the at least one of the determined thickness, and the determined bond line depth (401); generating a laser beam with a laser and inputting the laser beam into a modulator (403); generating a waveform from a waveform generator, wherein the waveform is based on selected pulse width and selected temporal profile (405); inputting the generated waveform into a high voltage driver to output a high voltage signal (407); inputting the high voltage signal into the modulator to modulate and shape a temporal profile of the laser beam with a polarizer based on the selected pulse width and the selected temporal profile (409); amplifying the modulated and shaped laser beam with an optical amplifier (411); delivering the amplified, modulated, and shaped laser beam to the one or more locations on the workpiece (413); and repeating steps 1-7 for each subsequent location on the workpiece.

The acts of method 400 may also be embedded on a tangible computer readable medium that may be executed by a computer or like processing device to provide one or more instructions to associated hardware for performing the acts of the method. For example, the act of generating a laser beam with a laser may be executed by a computer and like processing device with instructions sent to corresponding laser hardware to generate a laser beam.

Unless specifically stated to the contrary, the numerical parameters set forth in the specification, including the attached claims, are approximations that may vary depending on the desired properties sought to be obtained according to the exemplary embodiments. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Furthermore, while the systems, methods, and apparatuses have been illustrated by describing example embodiments, and while the example embodiments have been described and illustrated in considerable detail, it is not the intention of the applicants to restrict, or in any way limit, the scope of the appended claims to such detail. It is, of course, not possible to describe every conceivable combination of components or methodologies for purposes of describing the systems, methods, and apparatuses. With the benefit of this application, additional advantages and modifications will readily appear to those skilled in the art. Therefore, the invention, in its broader aspects, is not limited to the specific details and illustrative example and exemplary embodiments shown and described. Accordingly, departures may be made from such details without departing from the spirit or scope of the general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

As used in the specification and the claims, the singular forms "a," "an," and "the" include the plural. To the extent that the term "includes" or "including" is employed in the detailed description or the claims, it is intended to be inclusive in a manner co-extensive with the term "comprising," as that term is interpreted when employed as a transitional word in a claim. Furthermore, to the extent that the term "or" is employed in the claims (e.g., A or B) it is intended to mean "A or B or both." When the applicants intend to indicate "only A or B, but not both," then the term "only A or B but not both" will be employed. Similarly, when the applicants intend to indicate "one and only one" of A, B, or C, the applicants will employ the phrase "one and only one." Also, to the extent that the terms "in" or "into" are used in the specification or the claims, it is intended to additionally mean "on" or "onto." To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. Finally, where the term "about" is used in conjunction with a number, it is intended to include ±10% of the number. In other words, "about 10" may mean from 9 to 11.

What is claimed:

1. A system for temporal pulse shaping of a laser beam used for laser bond inspection, the system comprising:
   a laser that generates an input laser beam;
   a modulator operatively connected to the laser, wherein the modulator receives the input laser beam; and
   a processing device operatively connected to the modulator, wherein the processing device executes instructions to:
      determine at least one of a thickness and a bond line depth of a workpiece;
      select a pulse width and a temporal profile of a laser beam corresponding to the at least one of a thickness and a bond line depth; and
      control the modulator to shape the input laser beam based on the selected pulse width and temporal profile.

2. The system of claim 1, further comprising a waveform generator operatively connected to the processing device and a high voltage driver that is operatively connected to the modulator, wherein modulator is controlled using a high voltage output signal generated by the high voltage driver, and wherein an output waveform from the waveform generator is input into the high voltage driver to generate the high voltage output signal.

3. The system of claim 2, further comprising a polarizer operatively connected to the modulator, wherein the modulator alters the polarization of the input laser beam and outputs a modulated laser beam, and the polarizer modulates the laser beam as the modulated laser beam passes through the polarizer.

4. The system of claim 3, wherein the modulated laser beam is rotated in a first polarization direction relative to a second polarization direction of the polarizer to vary an energy and amplitude of the laser beam.

5. The system of claim 1, further comprising a polarizer operatively connected to the modulator, wherein the modulator outputs a modulated laser beam and is controlled with a high voltage output signal that is input into the modulator, and the polarizer shapes the temporal profile of the laser beam as the modulated laser beam passes through the polarizer.

6. The system of claim 1, wherein the laser comprises at least one of: a continuous wave (CW) laser, a CW fiber laser, a diode pumped (CW) laser; a diode pumped CW fiber laser; and a long pulse laser oscillator.

7. The system of claim 1, wherein the modulator comprises at least one of: an electro-optic modulator; an acousto-optic modulator; and an electro-optic Pockels cell.

8. The system of claim 1, further comprising a polarizer operatively connected to the modulator, wherein the modulator and the polarizer modify at least one of a leading edge and a trailing edge of the temporal profile of the laser beam.

9. The system of claim 1, wherein the pulse width is between 70 ns and 500 ns.

10. A system for temporal pulse shaping of a laser beam for laser bond inspection, the system comprising:
    a processing device that executes instructions to:
       determine at least one of a thickness and a bond line depth of a workpiece;
       select a pulse width and a temporal profile of a pulsed, modulated, amplified laser beam corresponding to the at least one of a thickness and a bond line depth; and
       generate a trigger signal based on the selected pulse width and temporal profile;
    a laser operable to produce an input laser beam, wherein the laser comprises at least one of: a continuous wave (CW) laser, a CW fiber laser, a diode pumped (CW) laser; a diode pumped CW fiber laser; and a long pulse laser oscillator;
    a waveform generator operatively connected to the processing device, wherein the waveform generator is operable to generate a time dependent waveform in response to the trigger signal, wherein the time dependent waveform is input into a high voltage driver;
    a high voltage driver operatively connected to the waveform generator, wherein the time dependent waveform is input into the high voltage driver, and wherein the high voltage driver is operable to output a high voltage signal in response to the time dependent waveform;
    a modulator operatively connected to the high voltage driver, wherein the modulator is operable to receive the input laser beam, and further operable to modulate the input laser beam, in response to the high voltage signal, to output a modulated laser beam, wherein the modulator is at least one of: an electro-optic modulator, an acousto-optic modulator, and an electro-optic Pockels cell;
    a polarizer operatively connected to the modulator, wherein the polarizer is operable to receive the modulated laser beam, and further operable to output a pulsed and modulated laser beam; and
    an optical amplifier operatively connected to the polarizer, wherein the optical amplifier is operable to receive the pulsed and modulated laser beam, and further operable to amplify the pulsed and modulated laser beam to output the pulsed, modulated, amplified laser beam.

11. The system of claim 10, wherein the modulated laser beam is rotated in a first polarization direction relative to the second polarization direction of the polarizer when the high voltage signal is received by the modulator to vary an energy and an amplitude of the pulsed and modulated laser beam output by the polarizer.

12. The system of claim 11, wherein the high voltage signal is pulsed to modify at least one of a leading edge and a trailing edge of the temporal profile of the pulsed, modulated, amplified laser beam.

13. The system of claim 10, wherein the pulse width is between 70 ns and 500 ns.

14. A method for temporal pulse shaping of a laser beam used in laser bond inspection of a workpiece, the method comprising the acts of:

(1) determining at least one of a thickness and a bond line depth at one or more locations on the workpiece and selecting a pulse width and a temporal profile of the laser beam corresponding to the determined thickness;
(2) generating the laser beam with a laser and inputting the laser beam into a modulator;
(3) generating a waveform from a waveform generator, wherein the waveform is based on the selected pulse width and the selected temporal profile;
(4) inputting the generated waveform into a high voltage driver to output a high voltage signal;
(5) inputting the high voltage signal into the modulator to modulate and shape a temporal profile of the laser beam based on the selected pulse width and the selected temporal profile;
(6) amplifying the modulated and shaped laser beam with an optical amplifier;
(7) delivering the amplified, modulated, and shaped laser beam to the one or more locations on the workpiece; and
(8) repeating acts 1-7 for each subsequent location on the workpiece.

15. The method of claim 14, wherein the laser comprises at least one of a continuous wave (CW) laser, a CW fiber laser, a diode pumped (CW) laser; a diode pumped CW fiber laser; and a long pulse laser oscillator.

16. The method of claim 14, wherein the modulator comprises at least one of an electro-optic modulator; an acousto-optic modulator; and an electro-optic Pockels cell.

17. The method of claim 14, wherein the pulse width of the laser beam is between 70 ns and 500 ns.

18. The method of claim 14, wherein a processing device is operatively connected to at least one of the waveform generator and the high voltage driver, and wherein the processing device is operable to execute instructions to at least one of: output a time dependent voltage signal from the waveform generator; and input a time dependent voltage signal to the high voltage driver, and wherein a time dependent high voltage signal output from the high voltage driver is operable to shape a temporal profile of the laser beam.

19. The system of claim 8, wherein the leading edge, the trailing edge, or both of the temporal profile of the laser beam has a rise time of less than 5 ns.

20. A method for temporal pulse shaping of a laser beam used in laser bond inspection of a workpiece, the method comprising:
determining at least one of a thickness and a bond line depth at one or more locations on the workpiece and selecting a pulse width and a temporal profile of the laser beam corresponding to the determined thickness;
generating an input laser beam with a laser;
inputting the input laser beam into a modulator;
controlling the modulator based on the selected pulse width and the selected temporal profile;
modulating and shaping a temporal profile of a laser beam using the modulator and the input laser beam; and
delivering the laser beam that is modulated and shaped to the one or more locations on the workpiece.

21. The method of claim 20, wherein the laser comprises at least one of a continuous wave (CW) laser, a CW fiber laser, a diode pumped (CW) laser; a diode pumped CW fiber laser;
and a long pulse laser oscillator.

22. The method of claim 20, wherein the modulator comprises at least one of an electro-optic modulator; an acousto-optic modulator; and an electro-optic Pockels cell.

23. The method of claim 20, wherein the pulse width of the laser beam is between 70 ns and 500 ns.

24. The method of claim 20, wherein a processing device is operatively connected to at least one of the waveform generator and the high voltage driver, and wherein the processing device is operable to execute instructions to at least one of: output a time dependent voltage signal from the waveform generator; and input a time dependent voltage signal to the high voltage driver, and wherein a time dependent high voltage signal output from the high voltage driver is operable to shape a temporal profile of the laser beam.

* * * * *